United States Patent Office 2,899,458
Patented Aug. 11, 1959

2,899,458

PROCESS FOR PRODUCING OXY AROMATIC ACID CHLORIDES

Evelyn H. Wilson, Highland Park, N.J., assignor to Johnson & Johnson, a corporation of New Jersey No Drawing. Application November 8, 1955
Serial No. 545,801

4 Claims. (Cl. 260—480)

This invention relates to processes for the preparation of oxy-aroyl chlorides, such as the hydroxy, alkyloxy, aryloxy, acycloxy or aroyloxy derivatives, by reacting a chloriding agent with the corresponding aromatic carboxylic acid in the presence of a catalytic amount of a tertiary base, and more particularly to such a process wherein the acid is suspended in an inert liquid medium which medium is a solvent for the corresponding oxy-aroyl chloride.

The preparation of oxy-aroyl chlorides from the corresponding acid by means of a chloriding agent is known. However, poor yields of the desired material are obtained, and when such processes are applied to the preparation of o-hydroxy aroyl chlorides, generally this is highly contaminated with undesirable by-products.

The art is confronted by the problem of providing oxy-aroyl chlorides of high purity in an economical and convenient manner, with minimum formation of undesirable by-products.

The discoveries associated with the invention relating to solution of the above problems, and the objects achieved in accordance with the invention as set forth herein include: the provision of a process for the preparation of oxy-aroyl chlorides from the corresponding oxy-aromatic carboxylic acids by treating them with an appropriate chloriding agent in the presence of a catalytic amount of a tertiary base, the acids being suspended as a finely divided separate phase in an inert liquid medium which medium is a solvent for the oxy-aroyl chloride; the provision of such a process for preparing salicyl chloride from thionyl chloride and salicylic acid suspended in an aliphatic hydrocarbon, or mixture of aliphatic hydrocarbons, or halogenated derivatives of such aliphatic hydrocarbons boiling in a range of 30° to 120° C.; and other objects which will be apparent in view of details or embodiments of the invention as set forth hereinafter.

In order to facilitate a clear understanding of the invention, the following specific embodiments are described.

Example 1

In a corrosion resistant reaction vessel (glass lined, or stainless steel, or the like) equipped with heating and cooling means, reflux condenser, an agitator, gas exit tube, and means for protecting the contents from atmospheric moisture, a mixture of:

0.2 mol (28 parts by weight) of salicylic acid, suspended in
150 parts by weight of a mixture of saturated aliphatic hydrocarbons (boiling range 30° to 60° C.)
0.0005 mol (0.1 part) of pyridine is reacted with: 0.21 mol (25 parts) of thionyl chloride at a temperature of 30° C. at atmospheric pressure until a homogeneous solution results. The resulting mixture is filtered, and the filtrate is evaporated leaving a residue which is substantially pure salicyl chloride (melting point 14–17° C.).

The yield is substantially theoretical, and the process of the invention avoids the undesirable by-product obtained when a material such as benzene is used as a medium, or when phosphorus trichloride or the like phosphorus containing chloriding agent is used, and it also avoids the cumbersome grinding operations heretofore required; e.g. where the salt of the acid is employed as one reactant.

Example 2

The above procedure is repeated except with 1,2-hydroxy naphthoic acid using an analogous hydrocarbon mixture which boils at 65–75° C., and substantially pure 1,2-hydroxy-naphthoyl chloride is obtained (M.P. 85–87° C.) in corresponding yield.

Example 3

The Example 2 procedure is repeated except with 2,3-hydroxy naphthoic acid. The 2-hydroxy-3-naphthoyl chloride product obtained melts at 86–92° C.

Example 4

The Example 1 procedure is repeated except using 5-phenyl-salicylic acid. When the reaction mixture becomes homogeneous, it is filtered, and the filtrate boiled down to ⅓ the initial volume. The concentrated filtrate is chilled and the resulting crystalline solid is separated by filtration. The 5-phenyl-salicyl chloride product has an M.P. of 56–59° C.

Similarly, a 3-phenyl-salicyl chloride product of M.P. 42–45° C. may be obtained.

Example 5

The Example 4 procedure is repeated using a corresponding salicylic acid with a chloro substituent (instead of phenyl) on the ring, and comparable results are obtained.

Example 6

The Example 5 procedure is repeated using a corresponding 5-fluoro-salicylic acid; and the 5-fluoro-salicyl chloride product has an M.P. of 64–68° C.

Example 7

The Example 4 procedure is repeated using a corresponding salicylic acid with a cyclohexyl substituent on the ring, and comparable results are obtained.

Example 8

The Example 1 procedure is repeated using a 4-methyl-salicylic acid and the resulting 4-methyl-salicyl chloride product melts at 39–42° C.

Example 9

The Example 4 procedure is repeated using acetyl salicylic acid. Pure acetyl salicyl chloride (M.P. 48–51° C.) is obtained in substantially quantitative yield.

In a comparable run carried out in benzene as the hydrocarbon (without pyridine), the yield is only about ¼ to ⅓ of the above.

Example 10

The Example 4 procedure is repeated using 2-hydroxy-3-naphthoic acid acetate and a mixture of saturated aliphatic hydrocarbons (B.P. 60–75°). Pure 2-hydroxy-3-naphthoyl chloride acetate (2-acetoxy-3-naphthoyl chloride) is obtained in quantitative yield.

Example 11

The Example 9 procedure is repeated using acetyl-3-methyl-salicylic acid and pure acetyl-3-methyl-salicyl chloride (M.P. 52–54° C.) is obtained in practically quantitative yield.

Example 12

Following the Example 1 procedure, a mixture of 6- bromo-2-hydroxy-3-naphthoic acid, 1000 parts of chloroform, and .0015 mol dry pyridine is treated with 0.21 mol of oxalyl chloride. The resulting mixture is refluxed until hydrogen chloride evolution ceases, and the resulting solution is filtered and the filtrate evaporated to dryness, giving as a residue substantially pure 6-bromo-2-hydroxy-3-naphthoyl chloride.

*Example 13*

Following the above procedure, a mixture of 0.2 mol of 2-hydroxy-3-phenanthroic acid, 150 parts of a mixture of aliphatic hydrocarbons (B.P. 90–120°) and .005 mol of dry pyridine is treated with 0.21 mol of thionyl chloride, and refluxed until solution is complete, and evolution of hydrogen chloride ceases. The hot solution is filtered and the filtrate boiled down to ⅓ original volume. On chilling, substantially pure 2-hydroxy-3-phenanthroyl chloride crystallizes out and is recovered.

*Example 14*

The Example 1 procedure is repeated using 3-hydroxybenzoic acid and corresponding results are obtained.

Comparable results to the foregoing are achieved with various modifications thereof including the following. The catalyst or base may be any soluble or dispersible tertiary amine such as the following: dimethylaniline, quinoline, pyridine, triethyl amine, triphenyl amine, and N-methyl piperidine. The catalytic amount thereof may be in the range of 0.0025 to 0.1 mol per mol of acid, preferably about 0.005 mol. The chloriding agent may be thionyl chloride, oxalyl chloride, or mixtures thereof and may be used in an amount in the range of 1 to 1.1 mols thereof per mol of the acid, preferably 1.1 mols. The reaction temperature may be in the range of 30 to 120° C., preferably about 30 to 60° C.

The medium may be a saturated aliphatic hydrocarbon or mixture thereof, preferably boiling in the range of 30 to 120° C., corresponding partially or completely halogenated derivatives. Generally, the medium should be liquid under the reaction conditions. It should be a solvent for the reaction product but substantially a non-solvent for the acid reactant. Preferably, the pressure is atmospheric, but higher or lower pressure may be used. The process may be conducted in a batch, intermittent or continuous manner.

The acid chlorides obtained in accordance with the invention may be used for preparing the corresponding amides, e.g., salicylamide, by reaction with ammonia or the appropriate amine, in known manner. The corresponding esters may be obtained from these acid chlorides by reaction with the appropriate alcohol, in known manner. They also may be used as acylating agents, e.g. for compounds containing active methylene groups, e.g. acetyl-acetone, phenols (analogous to alcohols), and the like.

It is indeed surprising that substituted aroyl chlorides may be obtained in such a convenient manner in accordance with the invention, especially when one considers the cumbersome methods suggested heretofore, or the relatively low yields obtained by prior processes. The process of the invention is particularly advantageous in the case of the hydroxy-aroyl chlorides, inasmuch as the resulting product is substantially free of the highly undesirable polymeric by-products, such as are obtained by prior processes.

In view of the foregoing disclosures, variations or modifications thereof will be apparent, and it is intended to include within the invention all such variations and modifications execpt as do not come within the scope of the appended claims.

I claim:

1. A process for preparing an oxy-aroyl chloride of the group consisting of the hydroxy, alkyloxy, aryloxy, acyloxy and aroyloxy derivatives, which process comprises reacting a chloriding agent with the corresponding oxyaromatic carboxylic acid, in the presence of a catalytic amount of a tertiary base and a liquid medium selected from the group consisting of aliphatic hydrocarbons and their halogen derivatives at a temperature in the range of about 30 to 120° C., and recovering the said oxy-aroyl chloride, said medium being a solvent for the reaction product but substantially a nonsolvent for the acid reactant and said chloriding agent being free of phosphorus.

2. A process of claim 1 wherein thionyl chloride is reacted with salicylic acid suspended in the presence of a saturated aliphatic hydrocarbon boiling in the range of 30 to 60° C., and in the presence of pyridine catalyst.

3. A process of claim 1 wherein thionyl chloride is reacted with acetyl salicylic acid in the presence of a saturated aliphatic hydrocarbon boiling in the range of 30 to 60° C. and in the presence of pyridine catalyst.

4. A process of claim 1 wherein thionyl chloride is reacted with 2,3-hydroxy naphthoic acid in the presence of a saturated aliphatic hydrocarbon boiling in the range of 65 to 75° C. and in the presence of pyridine catalyst.

References Cited in the file of this patent

UNITED STATES PATENTS 1,684,273    Higgins _____ Sept. 11, 1928

FOREIGN PATENTS 401,643    Great Britain _____ Feb. 11, 1932

OTHER REFERENCES

Thionyl Chloride in Organic Synthesis, Synthetic Organic Chemicals, vol. 4, No. 4, April 1930 (Eastman Kodak Co.).

Groggins: Unit Proc. in Org. Syn., p. 224 (1952) (McGraw-Hill Book Co., N. Y.).

Houben-Weyl: Methoden der Organischen Chemie, vol. III, p. 469 (1952).